MAGNETIC RECORDING CIRCUIT

Filed April 30, 1962 2 Sheets-Sheet 1

INVENTOR
ANDREW GABOR
BY
Douglas M. Clarkson
ATTORNEY

MAGNETIC RECORDING CIRCUIT

Filed April 30, 1962 2 Sheets-Sheet 2

INVENTOR
ANDREW GABOR
BY
Douglas M. Clarkson
ATTORNEY 3,267,483

MAGNETIC RECORDING CIRCUIT

Andrew Gabor, Port Washington, N.Y., assignor to Potter Instrument Company, Inc., Plainview, N.Y., a corporation of New York Filed Apr. 30, 1962, Ser. No. 191,361
3 Claims. (Cl. 346—74)

This invention, generally, relates to high density digital magnetic recording systems and, more particularly, to an electrical circuit for recording information magnetically.

Apparatus that involve storing digital information on a magnetic medium by magnetically saturating spots require that these spots be spaced as closely together as possible to increase the "density" of the information. The digital information is represented by the spots on the medium being magnetized in the direction of the surface motion or in the direction opposite thereto, and this information, then, can be recovered by producing a relative motion between the magnetized spot and the gap of a suitable transducer read head.

For low tape speeds, electrical circuits to develop magnetizing flux at selected spots in the tape are relatively easy to construct. However, as tape speeds increase, it becomes increasingly difficult to limit the dimensions of each magnetized spot.

The recording at each desired spot is obtained by a "flux transition" which is an abrupt change in the direction of magnetic flux on the tape surface. Since the magnetic flux is always produced in the direction of or opposite to the tape motion, a flux transition represents a 180° reversal of the magnetic flux vector.

Ideally, of course, the flux transition may take place within zero distance on the tape surface. However, for various reasons including the finite transition time of the recording field combined with the interaction between the fields of adjacent magnetic particles, the flux transition is always spread over a finite distance.

If the flux transition is recorded at very slow surface speeds (approximately 10 inches per second for example), the recorded pattern will generally not depend on surface speed. However, if the surface speed is increased to 100 inches per second and above, the time it takes the recording field to produce a full reversal becomes significant and the spread of the recorded flux transition is increased.

It is a principal object of the invention to provide a new and improved electrical circuit for driving a transducer in an information processing apparatus.

Another object of the invention is to provide electrical circuit means to develop a magnetic pattern in a predetermined manner.

Still another object of the invention is to provide a relationship to select specific component values to develop a predetermined magnetic characteristic.

Briefly, an information processing apparatus in accordance with the basic concepts of the present invention includes a medium, such as a tape, adapted to store information in magnetic bits and transducer means adapted to transfer information by means of magnetic lines of force. A new and improved electrical circuit to develop a desired magnetic value in the transducer means includes a drive impedance shunted by another impedance having a predetermined resistive component. By this means, the dimensions of magnetized spots on the medium are controlled accurately at faster and faster recording speeds.

The above and other objects and advantages of the invention will become more apparent from the following detailed description of a preferred form of the invention taken in conjunction with the accompanying drawings, in which.

Figure 1:
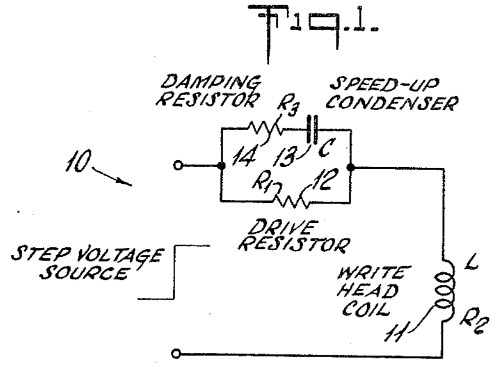
FIG. 1 is a circuit diagram in accordance with the invention.

Referring now to FIG. 1 of the drawings, the circuit identified generally by the numeral 10 is a recording circuit in accordance with the invention and includes a winding or coil 11 to induce magnetic flux in a transducer head (not shown). Also included in the circuit 10 is a drive resistor 12 which will be identified hereinafter also by the letter $R_1$.

A series connected condenser 13 and resistor 14 is connected in parallel across the drive resistor 12, and the condenser 13 is designated also by the letter C and the resistor 14 is designated also by the letter $R_3$. The letter $R_2$ will be used to designate the usual electrical resistance of the coil 11, and the letter L designates the inductance of the coil 11.

While it will be understood that the invention is adapted for use with any recording medium, it will be described hereinafter in connection with a magnetic tape handling apparatus.

A major advantage of tape handling apparatus (or "tape transports" as they are called) is their economy. Considering the price of a tape transport and the storage capacity of one reel, the cost of processing information by magnetic tape transports is only about 0.01 cents per bit, which is several times less than with any other type apparatus.

Figure 2:
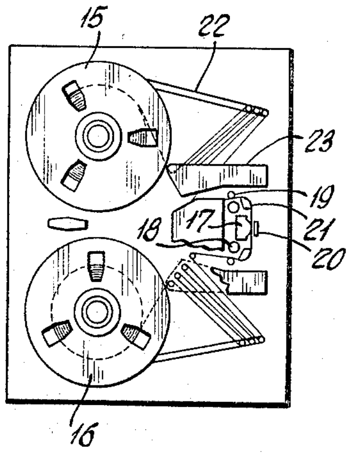
FIG. 2 is a view of a tape handler apparatus with which the circuit of the invention is adapted to operate.

Such a tape transport is shown in FIG. 2 of the drawings for illustrative purposes. Two reels 15 and 16 store tape for passage past a read-write magnetic transducer head 17 driven by one of two capstans 18 and pinch rollers 19. A magnetic shield 20 is positioned on the opposite side of the tape from the head 17 to reduce "cross-talk."

Two guides 21 direct the tape across the head 17, and a tension arm 22 and roller assembly 23 cooperate to develop a plurality of loops in the tape for temporary tape storage during start, stop and reversals in tape motion.

Figure 3:
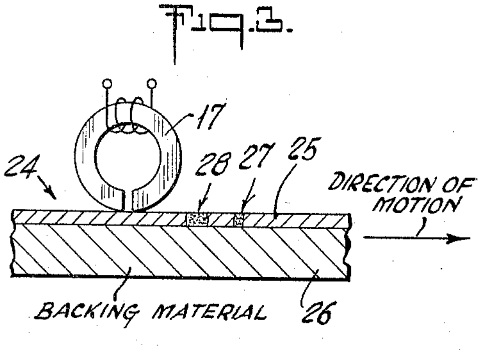
FIG. 3 is a diagrammatic illustration of a magnetic recording medium.

Referring now to FIG. 3 of the drawings, a magnetic tape is identified generally by the numeral 24 and includes a coating of magnetic material 25 on a backing 26 of plastic material, such as Mylar for example. The spot 27 indicates the "resolution" (minimum distance measured in the direction of tape motion) of one magnetized bit of information for slow tape speeds.

However, as tape speeds increase, the bit of information will assume the proportions indicated by the spot 28. To improve the resolution, that is, to reduce the dimensions of the spot 28 to those of the spot 27 for greater tape speeds, the inductive effects and the iron core effects of the record head 17 must be improved.

With the availability of fast acting power transistors today, switching time in the recording circuit can be as fast as 50 nanoseconds ($10_{-9}$ seconds), but in most of the practical cases, this is not a significant contribution toward the reduction of the flux transition time. Therefore, past efforts have been directed largely toward improving the inductive and the iron core effects of the transducer head.

The iron core effects, however, are due primarily to the physical characteristics of the magnetic circuit involving the transducer head. On the other hand, the inductive effects are due to the finite time that electric current requires to build up in the coil of the head.

The time constant of the magnetic flux rise which results from a build-up of electric current in the head coil is represented by the following equation:

$$h=h_1+h_2 \quad (1)$$

where, $h_1$ is the inductive time constant of the write head coil and the drive resistor, and $h_2$ is the time constant of the fictitious "secondary" coil with its fictitious load resistor.

Since $h_2$ does not depend upon the parameters of the write coil and the drive resistor, it is a fixed constant for a given core and depends solely on the physical configuration and magnetic properties of the core. Therefore, the value $h_2$ will be referred to hereinafter as the characteristic time constsant of the core.

Typical cores with metallic laminations can be built with cahracteristic time constants between two and five microseconds ($10^{-6}$ seconds). Comparing this with the time constants of typical write coils and switching circuits, it is evident that in laminated write heads, the characteristic time constant sets the limit on the writing speed.

Although the characteristic time constant is inherent in a given core, a circuit in accordance with the principles of the present invention permits the achievement of greatly improved transducer head performance. By way of illustration, refer to FIGS. 4 and 5 of the drawings.

Figure 4:
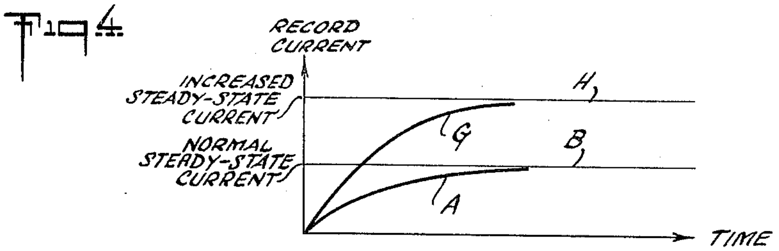
FIG. 4 is a chart of current vs. time.
Figure 5:
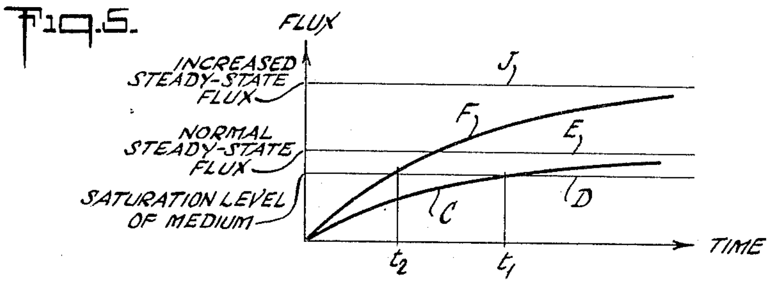
FIG. 5 is a chart of flux vs. time.

Curve A in FIG. 4 shows current build-up to the steady-state value that is required to achieve a desired magnetization, which is achieved after an interval of time $t_1$ as shown in FIG. 5, and this magnetization is somewhat greater than the minimum necessary to obtain flux saturation. The letter B in FIG. 4 indicates the magnitude of the current under steady state conditions.

The magnetic flux that is developed in the transducer head is illustrated by the curves in FIG. 5, wherein the curve C shows the rise in flux due to the current of curve A, FIG. 4. The level D represents the magnitude of the flux at saturation, and the level E represents the magnitude of the flux actually developed. The excess flux of level E over that required by level D represents a safety factor of a desired amount, such as 30%.

A time interval $t_1$ is necessary for the magnetic flux of curve C to achieve saturation in a spot on the tape surface, such as the spot 27 in FIG. 3, but as explained previously, this time interval $t_1$ for faster tape speeds is longer than desired because it produces a spot of too large dimensions, such as the spot 28 in FIG. 3.

To reduce the time $t_1$ to a value such as $t_2$ in FIG. 5, it is necessary that the magnetic flux rise at a faster rate, such as that illustrated by the curve F, and therefore, a faster rise in current is necessary to develop this flux, such as a current rise shown by curve G in FIG. 4. This faster rise in current to produce a faster rise in magnetic flux is termed "over driving," and it may be seen readily in FIGS. 4 and 5 that new, higher levels of current, H, and flux, J, result from this over driving.

While over driving achieves the desired reduction in time, it requires greater power, and therefore, greater power losses. In addition, the higher steady state magnetic flux generates greater fringe field intensity which, in turn, tends to impair resolution. Thus, part of what is gained with over driving is lost due to its side effects.

Figure 6:
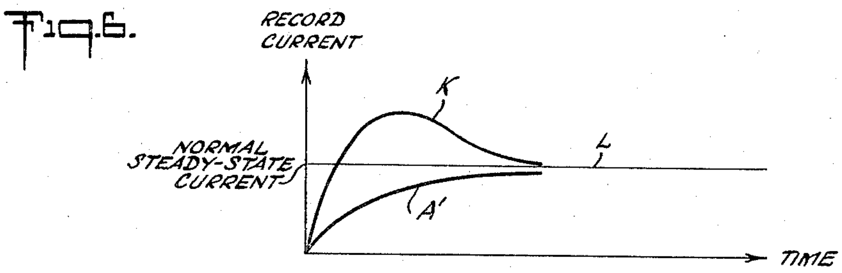
FIG. 6 is a chart of current vs. time.
Figure 7:
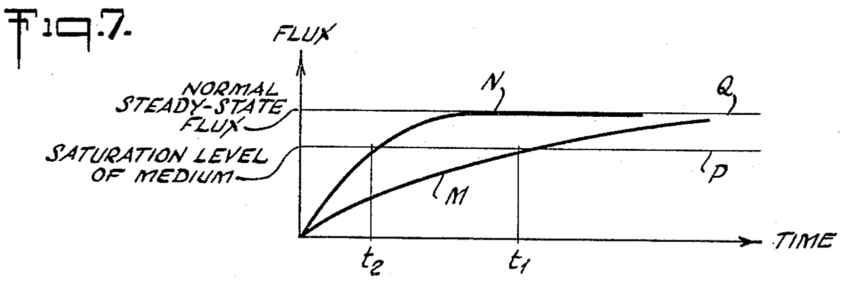
FIG. 7 is a chart of flux vs. time.

The current and flux curves of FIGS. 6 and 7, respectively, illustrate the form of the over driving values to obtain improved performance and reduce the disadvantages mentioned above. Curve A', in FIG. 6 is similar to curve A in FIG. 4, but the curve K in FIG. 6 illustrates a preferred form wherein the current performs the desired rapid rise, over shoots, but returns to the steady state level L of the normal current of curve A'.

In other words, according to curve K, over driving is used when it is needed, i.e., during a flux transition, but it is removed when it woud be disadvantageous, i.e., after the magnetic flux has built up to its steady state value. A simple and effective way to obtain a current build up in the form of curve K is to bypass the drive resistor 12 in FIG. 8 with a "speed-up" condenser 13.

Figure 8:
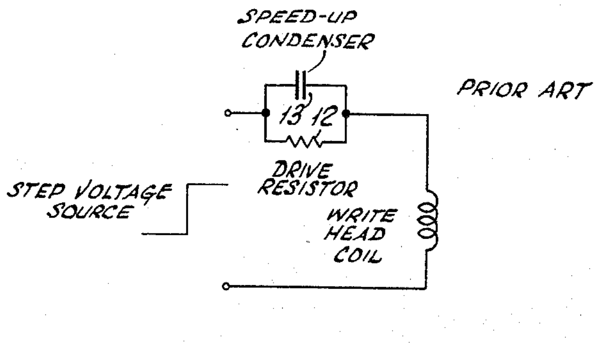
FIG. 8 is a circuit diagram to obtain the curves shown in FIGS. 6 and 7.

With a circuit as shown in FIG. 8, the magnetic flux in the write head coil will build up as shown in FIG. 7 by the curve M under normal current build up and by the curve N under over driving by a current in the form shown by the curve K in FIG. 6. The core saturation level is indicated at P in FIG. 7, and the steady state level is indicated as increased to Q.

However, the circuit shown in FIG. 1 in accordance with the principles of the present invention admits of greater freedom in the design of a circuit to provide a current waveform to satisfy a particular operating requirement, than would be possible with the circuit of FIG. 8. That is, by the addition of a damping resistor 14, FIG. 1, in series with the condenser 13, a family of curves may be obtained similar to the curve N in FIG. 7 but with the time $t_2$ decreasing all the way down to approximately one microsecond when laminated heads are used.

Where faster operation is desired, ferrite cores are used, which permit flux transitions considerably faster than laminated cores. However, the use of ferrite cores is limited generally to non-contact recording because of the severe wear problems that result from prolonged moving contact.

Selection of the components for the circuit of FIG. 1 in accordance with the invention is obtained from the following relationship:

$$\frac{\phi(T)}{\phi_o}=1+\frac{\exp.\left(-\frac{T}{h_1}\right)}{2u2'}(2F-uw')\exp.(-Tw') - (2F+uw')\exp.Tw' \quad (2)$$

where $\phi$ is magnetic flux in lines, T is the time $t_2$ from FIG. 7, $\phi_o$ is the steady state magnetic flux, $h_1$ is the inductive time constant from the coil 11, $u$ is a value obtained by Equation 9 hereinafter, $w'$ is a value obtained by Equation 10 hereinafter, and F is a value obtained by Equation 11 hereinafter.

The above equation will be modified, for those instances where the value of $w'$ is imaginary, to the following relationship:

$$\frac{\phi(T)}{\phi_o}=1-\frac{\exp.\left(-\frac{T}{h_1}\right)2F\sin w'T+uw'\cos w'T}{uw'} \quad (3)$$

Where the letters $d$, $d_1$ and $d_2$ represent the following relationships:

$$d=\frac{LC}{h_2} \quad (4)$$

$$d_1=\frac{L/R_1}{h_2} \quad (5)$$

$$d_2=\frac{R_3C}{h_2} \quad (6)$$

the following relationships are developed for each set of values which obtain from Equation 2 above:

$$T=\frac{t_2}{h_2} \quad (7)$$

$$h_1=2\frac{d_2+d_2^2+d_1d_2}{1+d_1+d_2} \quad (8)$$

$$u=2(d^2+d_2+d_1d_2) \quad (9)$$

$$w'=\frac{(1+d_1+d_2)^2}{4(d^2+d_2+d_1d_2)^2}-\frac{1}{d^2+d_2+d_1d_2} \quad (10)$$

$$F=\frac{1+d_1+d_2}{2}-\frac{d^2}{d_1}-d_2 \qquad (11)$$

By selecting a desired number of turns $n$ for the coil of the transducer head, the following relationships express the specific values of the components for a circuit in accordance with the present invention:

$$L=Kn^2 \text{ microhenrys} \qquad (12)$$

where K is a constant determined by the physical configuration and the magnetic properties of the core:

$$R=\frac{L}{h_2d_1} \text{ ohms} \qquad (13)$$

$$V=\frac{K_2R_1}{n} \text{ volts} \qquad (14)$$

where $K_2$ is the drive in ampere-turns required to saturate the medium:

$$C=\frac{h_2^2d^2}{L}10^3 \text{ Microfarads} \qquad (15)$$

$$R_3=\frac{h_2d_2}{C} \text{kilohms} \qquad (16)$$

From the above detailed description, it now will be evident for one skilled in the art to which the invention pertains that specific values may be calculated for connection as shown in FIG. 1 to obtain greatly increased magnetic flux reversals in shorter times to permit the magnetic tape speed to be increased to far greater values than heretofore possible for reliable information processing. The invention is set forth as to its scope in the following claims.

What is claimed is:

1. In an information processing apparatus comprising,
a medium capable of storing information in magnetic bits,
transducer means adapted to transfer information by means of magnetic spots developed to a predetermined value,
electrical circuit means to develop the magnetic value in the transducer means within a predetermined time interval,
the electrical circuit means including a drive resistor shunted by a speed-up condenser,
resistance means for selecting said predetermined time interval for magnetic flux to build up in said transducer means to develop said magnetic flux, and said resistance means being located in series with said speed-up condenser.

2. In an information processing apparatus comprising,
an elongated tape capable of storing information in magnetic bits,
transducer means adapted for a transfer of information by means of a magnetic spot developed to a predetermined value,
electrical circuit means to develop the magnetic value in the transducer means within a predetermined time interval,
the electrical circuit means including a drive resistor shunted by a capacitor,
shunted by a capacitor,
resistance means for selecting said predetermined time interval for magnetic flux to build up in said transducer means to develop said magnetic flux, and
said resistance means being located in series with said capacitor.

3. In an information processing apparatus comprising,
an elongated tape capable of storing information in magnetic bits,
transducer means including a drive coil adapted to transfer information by means of magnetic spots developed to a predetermined value,
high speed tape drive means to move the elongated tape at a predetermined high speed relative to the transducer means,
electrical circuit means to develop the magnetic value in the transducer means within a predetermined time interval,
the electrical circuit means including a drive resistor connected electrically in series with the drive coil of the transducer means and shunted by a capacitor,
resistance means for selecting said predetermined time interval for magnetic flux to build up in said transducer means to develop said magnetic flux, and
said resistance means being located in series with said capacitor.

References Cited by the Examiner

FOREIGN PATENTS 556,251 2/1957 Italy.

BERNARD KONICK, *Primary Examiner.*

IRVING SRAGOW, *Examiner.*

M. K. KIRK, A. F. BERNARD, *Assistant Examiners.*